United States Patent
Howe et al.

(10) Patent No.: US 10,171,238 B2
(45) Date of Patent: *Jan. 1, 2019

(54) SECURE DATA TRANSMISSION USING QUANTUM COMMUNICATION

(71) Applicant: The Boeing Company, Chicago, IL (US)

(72) Inventors: Wayne Richard Howe, Irvine, CA (US); Jeffrey H. Hunt, Thousand Oaks, CA (US); Edward Allen Adler, Palos Verdes Estates, CA (US)

(73) Assignee: THE BOEING COMPANY, Chicago, IL (US)

( * ) Notice: Subject to any disclaimer, the term of this patent is extended or adjusted under 35 U.S.C. 154(b) by 1032 days.

This patent is subject to a terminal disclaimer.

(21) Appl. No.: 14/249,196

(22) Filed: Apr. 9, 2014

(65) Prior Publication Data
US 2015/0295708 A1 Oct. 15, 2015

(51) Int. Cl.
| | |
|---|---|
| H04L 29/06 | (2006.01) |
| H04L 9/32 | (2006.01) |
| H04K 1/00 | (2006.01) |
| H04L 9/00 | (2006.01) |
| H04L 9/28 | (2006.01) |
| H04L 9/08 | (2006.01) |

(52) U.S. Cl.
CPC .................. H04L 9/0858 (2013.01)

(58) Field of Classification Search
CPC ...................................... H04L 9/0858
USPC .......... 380/28, 255, 262, 268; 713/160, 161, 713/168
See application file for complete search history.

(56) References Cited

U.S. PATENT DOCUMENTS

| | | | |
|---|---|---|---|
| 6,023,508 A * | 2/2000 | Bombard | G06Q 20/06 705/41 |
| 7,359,512 B1 | 4/2008 | Elliot | |
| 9,692,595 B2 | 6/2017 | Lowans et al. | |
| 2006/0294328 A1* | 12/2006 | Akiyama | G06F 13/1626 711/158 |
| 2007/0177729 A1 | 8/2007 | Reznik et al. | |
| 2008/0183999 A1* | 7/2008 | Balinsky | G06F 21/606 711/163 |
| 2008/0270824 A1* | 10/2008 | Kroesche | G06F 11/1048 714/6.11 |
| 2011/0150220 A1* | 6/2011 | Breton | H04L 63/0209 380/255 |
| 2013/0179995 A1* | 7/2013 | Basile | G06F 21/10 726/32 |
| 2013/0315395 A1 | 11/2013 | Jacobs | |
| 2014/0016779 A1* | 1/2014 | Lirakis | G06N 99/002 380/256 |

(Continued)

OTHER PUBLICATIONS

U.S. Appl. No. 13/848,872, filed Mar. 22, 2013, Hunt et al.

(Continued)

Primary Examiner — Aravind K Moorthy
(74) Attorney, Agent, or Firm — Gates & Cooper LLP

(57) ABSTRACT

Methods and systems for transmitting data are described. A random data stream is generated. A data stream is generated comprising the random data stream and indicators as to which data of the random data stream is valid data to be communicated to a recipient. The random data stream and/or the data stream may be communicated using quantum entanglement.

25 Claims, 8 Drawing Sheets

(56) References Cited

U.S. PATENT DOCUMENTS

2014/0098742 A1* 4/2014 Sefidvash ............... H04L 47/22
                                                              370/328
2014/0219443 A1   8/2014 Brainis et al.
2015/0134947 A1   5/2015 Varcoe et al.

OTHER PUBLICATIONS

U.S. Appl. No. 13/778,944, filed Mar. 27, 2013, Hunt et al.
Non-Final Office Action dated May 12, 2017 for U.S. Appl. No. 14/249,136.
Final Office Action dated Oct. 2, 2017 for U.S. Appl. No. 14/249,136.

* cited by examiner

SECURE DATA TRANSMISSION USING QUANTUM COMMUNICATION

BACKGROUND

Classical encryption generally involves scrambling clear text or other non-encrypted information according to a data scrambling algorithm in which the data scrambling algorithm's output data is modified or controlled by an encryption key. The encrypted output data is then stored in a physical storage medium such as a hard drive or other encrypted media, or transmitted to a receiver over a transmission media as a scrambled version of the clear text. The encryption algorithm may be as simple as an "exclusive or" function of the clear text and the encryption key, or a complex function such as Advanced Encryption Standard (AES) or Rivest Shamir Adleman (RSA) as is well known in the art. Decryption generally involves descrambling the encrypted data from the physical storage medium such as a hard drive or from the received transmission media into the original information by using a decryption algorithm which is controlled or modified by a decryption key. The decryption algorithm may be as simple as an "exclusive or" function of the encrypted data and the encryption key or a complex function such as AES or RSA. The encryption and decryption keys may be the same, e.g., symmetric keys, or different, e.g., asymmetric keys such as public-private pair keys. Generally these encryption and decryption keys are difficult to crack, so they are used over and over again. However, if these keys are hacked, cracked, or otherwise become known, then all subsequent (and even prior recorded encrypted messages) may become known or knowable.

SUMMARY

Illustrative examples of the present disclosure include, without limitation, a method for transmitting data. The method may comprise generating first data comprising a random data stream, and transmitting second data comprising indicators as to which data of the random data stream is valid data to be communicated.

In another aspect, an apparatus for transmitting data is provided. The system may comprise a random number generator configured to generate a random data stream. The system may also comprise a transmitter configured to transmit data comprising indicators as to which data of the random data stream is valid data.

In another aspect, a method for receiving data is provided. The system may comprise receiving first data comprising a random data stream. The method may also comprise receiving second data comprising indicators as to which data of the random data stream is valid data to be received. The method may also comprise using the first and second data to generate the valid data.

In another aspect, a system for transmitting data is provided. The system may comprise a random number generator and a first transmitter configured to transmit first data comprising a random data stream generated by the random number generator. The system may also comprise a second transmitter configured to transmit second data comprising indicators as to which data of the random data stream is valid data. The second transmitter may use quantum teleportation to transmit the second data.

The features, functions, and advantages that have been discussed can be achieved independently in various embodiments or may be combined in yet other embodiments, further details of which can be seen with reference to the following description and drawings.

BRIEF DESCRIPTION OF DRAWINGS

Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
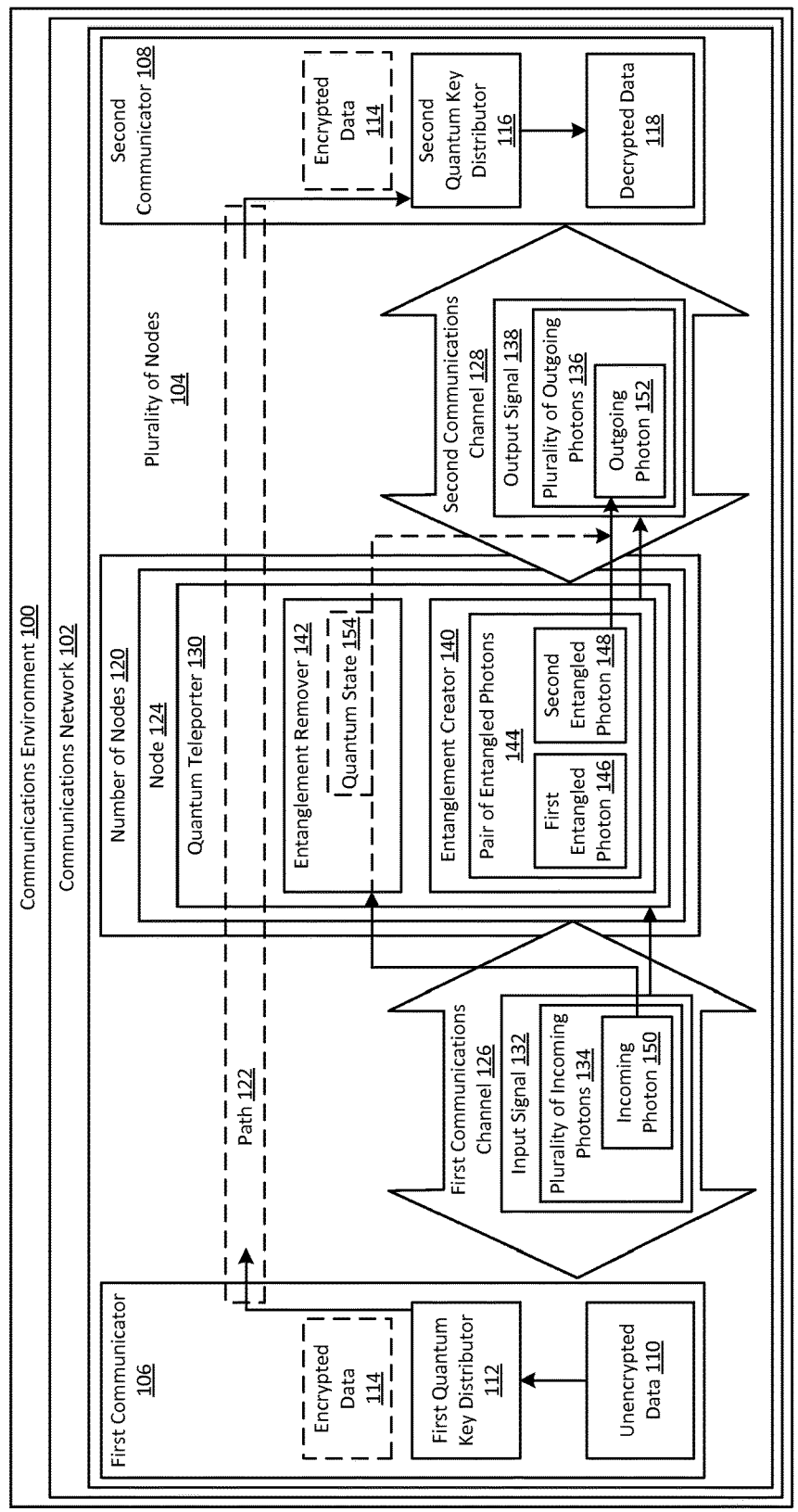
FIG. 1 depicts an example system which may be used in conjunction with the present disclosure.

To counter the potential compromising of encryption keys, completely random non-repetitive "one-time pads" (OTP) may be used. The concept of the one-time pads says that the encryption bits must be truly random (i.e., not algorithmically based) and can only be used once (i.e., no reuse of the encryption bits.) As long as these completely random one-time pad keys are not revealed, they have been mathematically proven to have "perfect secrecy" and are unable to be decrypted even if the clear text is known. Today, these completely random keys or OTPs must be shared over a completely secure channel, while the encrypted messages derived from them may be distributed over a non-secure or public communication medium or network, or stored in a physical medium such as a hard drive.

Quantum communication involves encoding information as quantum bits. As used herein, a "quantum bit," which may be also referred to a qubit or qbit, is a two-state quantum mechanical system. The quantum mechanical system may be realized using, for example, the polarization of a single photon. The qubit may have two polarization states—vertical polarization and horizontal polarization. Quantum mechanics allows a qubit to be in one state, the other state, or a superposition of both states at any given point in time. This physics process is known as quantum mechanical entanglement or quantum entanglement.

Quantum cryptography is the use of quantum mechanical effects to perform cryptographic tasks, such as, for example, encrypting and decrypting data. Quantum key distribution (QKD) is a quantum cryptographic technique that allows secure sharing of a quantum key to two endpoints in a point-to-point communication between a sender and a receiver. This quantum key is generated as a completely random stream of entangled qbit pairs with one stream of the entangled pairs sent to the sender and the other stream of "mate" entangled pairs sent to the receiver.

The sender encrypts the data using the random quantum key and sends this quantum encrypted data to the receiver. The receiver decrypts the quantum encrypted data using the random quantum key. This type of quantum encryption may ensure secure communications over standard non-secure (public) communications channels, such as, for example, unsecure public communications channels such as the Internet. An important and unique property of QKD is the ability of the two communicating users to detect the presence of any third party trying to eavesdrop and gain knowledge of the key, since the process of measuring a quantum system in general disturbs the system and is thus detectable. A third party trying to eavesdrop on the key must in some way measure it, thus introducing detectable anomalies. A physics property known as the no-cloning theorem says that it is not possible to reconstruct a quantum mechanical entanglement once it has been disturbed.

By using quantum superpositions or quantum entanglement and transmitting information in quantum states, a communication system can be implemented which detects eavesdropping. If the level of eavesdropping is below a certain threshold, a key can be produced that is guaranteed to be secure (i.e., the eavesdropper has no information about it), otherwise no secure key is possible and communication is aborted. Quantum keys can be used to generate classical keys which can be repeatedly used in classical symmetric or asymmetric encryption schemes, or quantum keys can be implemented as a continuous random stream used as a completely random non-repetitive quantum "one time pad" (OTP). However, in many applications, there are problems, difficulties, and complexities in implementing communications with present encryption methods, completely random keys such as OTPs, or even non-completely-random keys such as pseudo-random codes and/or keys. Such problems include processing overhead, non-detectable tampering including for example, eavesdroppers and man-in-the-middle attacks. Further, there are difficulties in implementing quantum systems and QKD systems where the random quantum bit stream is the actual encryption key. Therefore, there exists a need for improved methods, apparatus, and systems for implementing communications using randomness, and for secure data transmissions using quantum communications.

Classical methods of storing and/or transmitting clear text or other non-encrypted information in a secure manner comprise many different types of encryption techniques. Improvements disclosed herein may comprise storage or transmission of completely random or pseudo-random data streams with the clear text or other non-encrypted information hidden within the completely random or pseudo-random data streams. Instead of encrypting or scrambling the clear text into encrypted data using cryptographic keys, clear text may be "hidden in plain sight" in random, pseudo-random, or other data streams with an encoding scheme or other indicators which enable the receiver to identify which bits, bytes, or other information is valid data. This approach to encoding information "in plain sight" within random or pseudo-random streams can be particularly useful, especially for quantum communications.

Quantum cryptographic techniques may require a direct connection between the sender and the receiver for the generation and sharing of the random encryption key. Consequently, using quantum key distribution to send encrypted data over a large communications network comprised of multiple nodes may be more difficult than desired and, in some cases, may not be feasible.

Some methods for transporting an encryption key from a sender to a receiver across multiple nodes within a communications network may require that each of the nodes have quantum key distribution capabilities. In some cases, routing algorithms, graph theory algorithms, and metrics that have been disseminated to all nodes within the communications network may be used to transport encryption keys across these nodes.

These types of methods may be more time-consuming than desired and/or may require more processing power, hardware resources, and/or software resources than desired. Further, ensuring that every node within a communications network has quantum key distribution capabilities may be more expensive than desired.

Some cryptographic methods may use pseudorandom numbers, which is a sequence of numbers that approximates the properties of random numbers. However, a pseudorandom sequence is not truly random in that it is completely determined by a finite set of initial values and are reproducible. Generally, random sequences may be used for encryption keys but not for actual communications of the data.

In various implementations described in this disclosure, methods and systems for transmitting data using a random sequence is described, where the random stream is actually carrying the information and not acting as the encryption key. In some implementations, a random bit sequence is generated and transmitted to the recipient. A valid data sequence to be transmitted to the recipient may be indicated by sending a second sequence to the recipient that indicates which of the bits in the random bit sequence represent the valid data sequence.

Some example implementations described in this disclosure include sending the random sequence as well as the second sequence as quantum data across one or more nodes in a communications network. In one example implementation, a node receives an input signal comprised of incoming photons carrying data. Quantum states of the incoming photons are transferred to outgoing photons using quantum teleportation such that the data is transferred, or copied, to the outgoing photons. An output signal comprised of the outgoing photons carrying the data may then be sent out from the node to a next node.

Referring now to the figures and, in particular, with reference to FIG. 1, an illustration of a communications environment is depicted in the form of a block diagram in accordance with an illustrative example. Further details may also be found in U.S. application Ser. No. 13/848,872, filed Mar. 22, 2013, and U.S. application Ser. No. 13/778,944, filed Feb. 27, 2013, both of which are incorporated by reference. Communications environment 100 includes communications network 102. Communications network 102 may be comprised of plurality of nodes 104.

As used herein, a "node" in plurality of nodes 104 may be implemented in a number of different ways. For example, without limitation, a node may comprise at least one of a communications device, a switching device, a network switch, a router, a processor unit, a computer, an integrated circuit, a modem, a hub, a server, a workstation, a digital handset, or some other type of communications device.

As used herein, the phrase "at least one of," when used with a list of items, means different combinations of one or more of the listed items may be used and only one of the items in the list may be needed. For example, "at least one of item A, item B, and item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination. The item may be a particular object, thing, or a category. In other words, "at least one of" means any number of and any combination of items may be used from the list, but not all of the items in the list may be required.

First communicator 106 and second communicator 108 may be examples of nodes in plurality of nodes 104. First communicator 106 is configured to send secure data to second communicator 108. For example, first communicator 106 may encrypt unencrypted data 110 using first quantum key distributor 112 to form encrypted data 114. Second communicator 108 may receive encrypted data 114 and then decrypt encrypted data 114 using second quantum key distributor 116 to form decrypted data 118. Decrypted data 118 may contain unencrypted data 110. In this manner, second quantum key distributor 116 may decrypt encrypted data 114 to retrieve unencrypted data 110.

In this illustrative example, first quantum key distributor 112 and second quantum key distributor 116 may be implemented using standard quantum key distribution protocols. First quantum key distributor 112 and second quantum key distributor 116 may communicate over a quantum channel (not shown in this view) to share a quantum encryption key that may be used to encrypt and decrypt data. In this manner, encrypted data 114 may be quantum encrypted data.

The quantum encryption key may be comprised of one or more qubits. In some cases, the quantum encryption key may be a continuous stream of qubits. Further, depending on the implementation, the quantum encryption key may or may not be random.

In one illustrative example, first quantum key distributor 112 may include an encryptor configured to receive a random number from a data generator, which in some embodiments may be a random number generator. The random number generator may be implemented within or outside of first quantum key distributor 112. The encryptor may use the random number to encrypt unencrypted data 110 and form encrypted data 114.

As depicted, encrypted data 114 may be sent from first communicator 106 to second communicator 108 across number of nodes 120 along path 122. As used herein, a "number of," when used in reference to items, may mean one or more items. In this manner, number of nodes 120 may be one or more nodes.

In this illustrative example, path 122 may comprise the sequence of nodes in communications network 102 through which encrypted data 114 is transmitted. Path 122 may include first communicator 106, second communicator 108, and number of nodes 120. Number of nodes 120 may use quantum teleportation to send encrypted data 114 received at number of nodes 120 from first communicator 106 to second communicator 108. By using quantum teleportation, encrypted data 114 may remain encrypted as encrypted data 114 passes through number of nodes 120.

Node 124 is an example of one of number of nodes 120. Node 124 may be configured to receive encrypted data 114 over first communications channel 126 and send out encrypted data 114 over second communications channel 128. As used herein, a "communications channel," such as first communications channel 126 and second communications channel 128, may be selected from a group that includes a wired communications channel, a wireless communications channel, an optical communications channel, a fiberoptic channel, a waveguide, or some other type of communications channel or link.

Node 124 uses quantum teleporter 130 to receive and send out encrypted data 114. In particular, quantum teleporter 130 may receive input signal 132 over first communications channel 126 from a previous node with respect to path 122. This previous node may be first communicator 106 or one of number of nodes 120. Input signal 132 may be comprised of plurality of incoming photons 134 arriving at quantum teleporter 130 over time.

Quantum teleporter 130 uses plurality of incoming photons 134 to form plurality of outgoing photons 136. Quantum teleporter 130 sends out plurality of outgoing photons 136 in the form of output signal 138 over second communications channel 128 to a next node with respect to path 122.

As depicted, quantum teleporter 130 includes entanglement creator 140 and entanglement remover 142. Entanglement creator 140 is configured to create pair of entangled photons 144 for each one of plurality of incoming photons 134 received. Pair of entangled photons 144 includes first entangled photon 146 and second entangled photon 148. First entangled photon 146 and second entangled photon 148 may be considered entangled when the quantum state of each of these photons may need to be described with reference to the other photon, even though the two photons may be physically separated.

First entangled photon 146 is sent to meet with one of plurality of incoming photons 134. For example, first entangled photon 146 may be sent to meet with incoming photon 150 in entanglement remover 142. Second entangled photon 148 may be sent in a different direction as outgoing photon 152. Incoming photon 150 may carry encrypted information.

Entanglement remover 142 receives both incoming photon 150 and first entangled photon 146. In response to receiving both incoming photon 150 and first entangled photon 146, entanglement remover 142 removes, or destroys, the entanglement between first entangled photon 146 and second entangled photon 148.

When the entanglement between first entangled photon 146 and second entangled photon 148 is removed, outgoing photon 152 is formed. Simultaneously, quantum state 154 of incoming photon 150 is transferred to, or copied to, outgoing photon 152. The transferring of quantum state 154 of incoming photon 150 to outgoing photon 152 results in the encrypted information that is carried by incoming photon 150 being teleported to outgoing photon 152. Outgoing photon 152 carrying the encrypted information may then be sent out, or output, from quantum teleporter 130.

As a result of this quantum teleportation, outgoing photon 152 output from quantum teleporter 130 may be relatively indistinguishable from incoming photon 150 received at quantum teleporter 130. In this manner, encrypted data 114 carried by plurality of incoming photons 134 may be teleported to plurality of outgoing photons 136 without ever being decrypted, modified, or processed in some other manner.

Each node in plurality of nodes 104 may have a quantum teleporter similar to quantum teleporter 130. In this manner, quantum teleportation may be used to send quantum encrypted data across one or more of plurality of nodes 104 in communications network 102.

The illustration of communications network 102 within communications environment 100 in FIG. 1 is not meant to imply physical or architectural limitations to the manner in which an illustrative embodiment may be implemented. Other components in addition to or in place of the ones illustrated may be used. Some components may be optional. Additionally, the blocks are presented to illustrate some functional components. One or more of these blocks may be combined, divided, or combined and divided into different blocks when implemented in other illustrative embodiments.

For example, although first quantum key distributor 112 is depicted as being part of first communicator 106, first quantum key distributor 112 may be considered separate from first communicator 106, but in communication with first communicator 106 in other examples. Similarly, although second quantum key distributor 116 is depicted as being part of second communicator 108, second quantum key distributor 116 may be considered separate from second communicator 108, but in communication with second communicator 108 in other examples.

Further, although the illustrative examples have been described using photons, some other type of quantum mechanical system may be used. For example, without limitation, input signal 132 may be comprised of a plurality of incoming electrons and output signal 138 may be comprised of a plurality of outgoing electrons. In other words, quantum communications and quantum cryptography between plurality of nodes 104 may be implemented using electrons instead of photons, or some other type of quantum mechanical system that may be used to form qubits.

Figure 2:
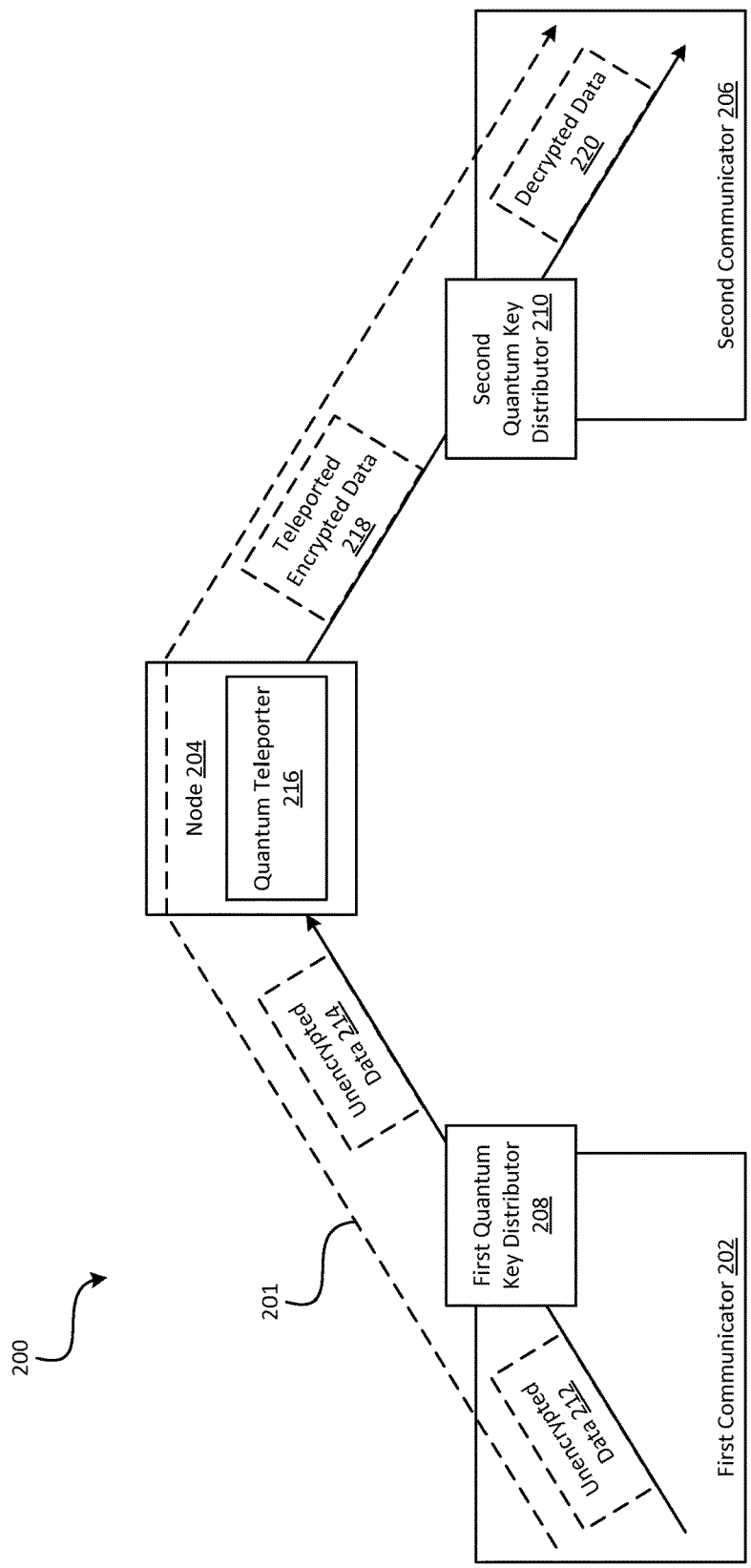
FIG. 2 depicts an example system which may be used in conjunction with the present disclosure.

With reference now to FIG. 2, an illustration of a path within a communications network is depicted in accordance with an illustrative example. Communications network 200 is an example of one implementation for communications network 102 in FIG. 1. Path 201 through communications network 200 includes first communicator 202, node 204, and second communicator 206. First communicator 202, node 204, and second communicator 206 are examples of implementations for first communicator 106, node 124, and second communicator 108, respectively, in FIG. 1.

As depicted, first communicator 202 is configured to encrypt unencrypted data 212 using first quantum key distributor 208 to form encrypted data 214. First communicator 202 sends encrypted data 214 to node 204. Node 204 uses quantum teleporter 216 to teleport the encrypted data and output teleported encrypted data 218. Second communicator 206 uses second quantum key distributor 210 to decrypt teleported encrypted data 218 and form decrypted data 220.

Figure 3:
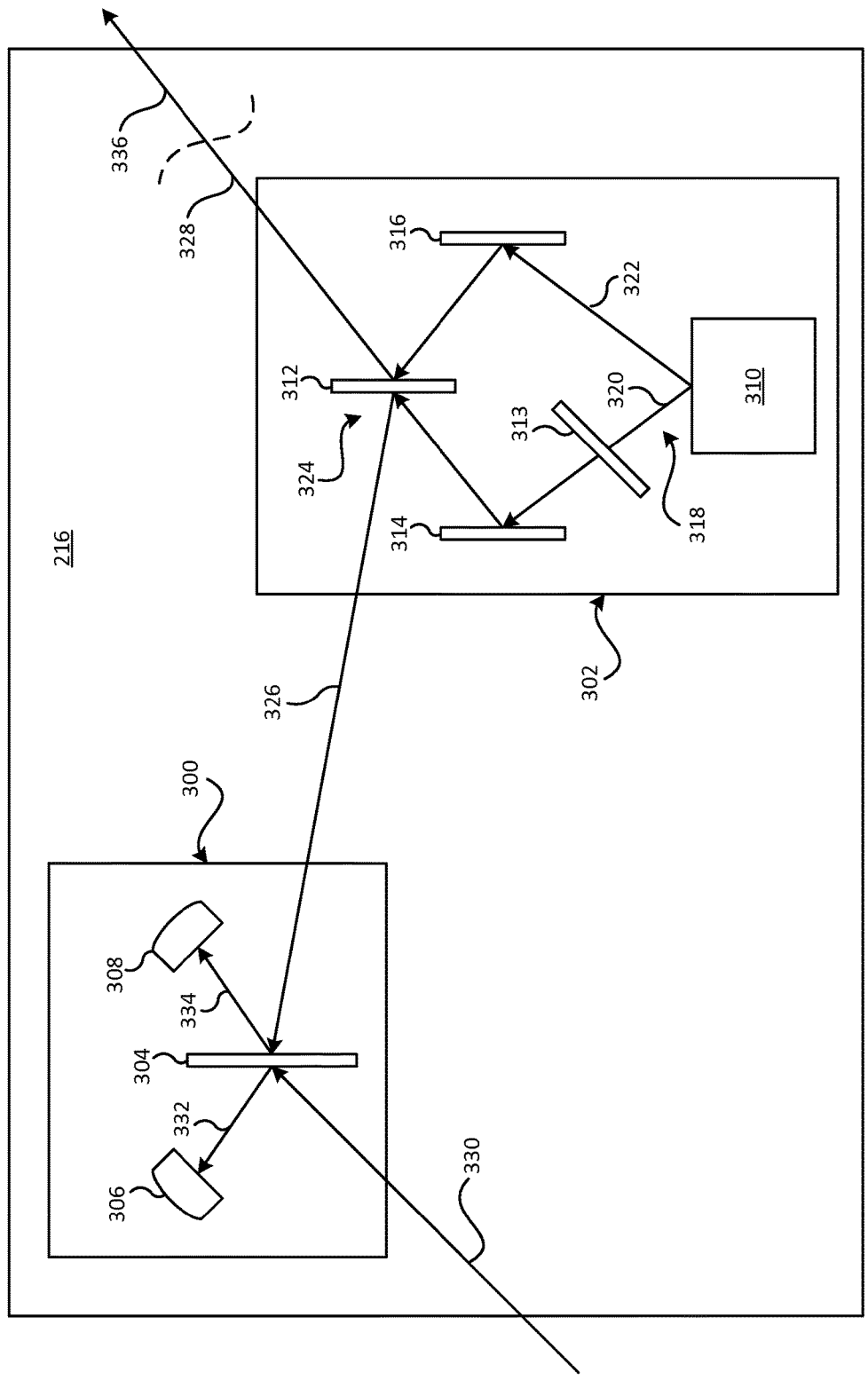
FIG. 3 depicts an example system which may be used in conjunction with the present disclosure.

With reference now to FIG. 3, an illustration of quantum teleporter 216 from FIG. 2 is depicted in accordance with an illustrative example. In this illustrative example, quantum teleporter 216 includes entanglement remover 300 and entanglement creator 302. Entanglement remover 300 includes beam splitter 304, detector 306, and detector 308. Entanglement creator 302 includes coupled photon creator 310, beam splitter 312, wave plate 313, mirror 314, and mirror 316.

As depicted, coupled photon creator 310 is configured to create pair of coupled photons 318. Pair of coupled photons 318 includes first photon 320 and second photon 322. In one illustrative example, coupled photon creator 310 may include a laser, an intensity control device, a polarization control device, a frequency control device, and a nonlinear optical element. The nonlinear optical element may be used to convert a single laser photon emitted from the laser into pair of coupled photons 318.

Beam splitter 312 in entanglement creator 302 may be used to entangle first photon 320 and second photon 322. Prior to becoming entangled with second photon 322, first photon 320 may be sent through wave plate 313. Wave plate 313 is used to change the polarization of first photon 320. In one illustrative example, wave plate 313 takes the form of a half-wave plate that is configured to rotate the polarization direction of first photon 320.

First photon 320 may be sent through wave plate 313 towards mirror 314. Mirror 314 directs first photon 320 towards beam splitter 312. Similarly, second photon 322 is sent towards mirror 316. Mirror 316 directs second photon 322 towards beam splitter 312. In other words, mirror 314 and mirror 316 are used to steer first photon 320 and second photon 322, respectively, towards beam splitter 312. Of course, in other illustrative examples, a plurality of optical elements may be used to steer first photon 320 and second photon 322 towards beam splitter 312.

Beam splitter 312 causes entanglement between first photon 320 and second photon 322 such that pair of entangled photons 324 is formed. Pair of entangled photons 324 includes first entangled photon 326 and second entangled photon 328. In some illustrative examples, first entangled photon 326 may be referred to as a transporter photon.

First entangled photon 326 is sent to meet with incoming photon 330 at entanglement remover 300. Both incoming photon 330 and first entangled photon 326 are received at beam splitter 304 within entanglement remover 300. Incoming photon 330 and first entangled photon 326 are interfered at beam splitter 304. Beam splitter 304 may be implemented using, for example, a 50/50 beam splitter.

Detector 306 and detector 308 may be used to measure first output 332 and second output 334, respectively, of beam splitter 304. Detector 306 and detector 308 may each be implemented using, for example, without limitation, control optics, a polarization measurement device, and a light-to-electronic signal converter. The light-to-electronic signal converter may take the form of, for example, without limitation, a photodiode, an avalanche photodiode, a photomultiplier, or some other type of element.

In response to incoming photon 330 and first entangled photon 326 meeting at beam splitter 304 and the measurement of at least one of first output 332 and second output 334 by detector 306 and detector 308, respectively, the entanglement between first entangled photon 326 and second entangled photon 328 is removed to form outgoing photon 336. Simultaneously, the quantum state of incoming photon 330 is transferred to outgoing photon 336.

In this manner, outgoing photon 336 may have the same quantum state as incoming photon 330 such that outgoing photon 336 is relatively indistinguishable from incoming photon 330. The transferring of the quantum state of incoming photon 330 to outgoing photon 336 results in the teleportation of the encrypted information carried by incoming photon 330 to outgoing photon 336. Quantum teleporter 216 outputs outgoing photon 336.

The illustrations of communications network 200 in FIG. 2 and quantum teleporter 216 in FIG. 3 are not meant to imply physical or architectural limitations to the manner in which an illustrative embodiment may be implemented. Other components in addition to or in place of the ones illustrated may be used. Some components may be optional.

The different components shown in FIG. 3 may be illustrative examples of how components shown in block form in FIG. 1 can be implemented as physical structures. Additionally, some of the components in FIG. 3 may be combined with components in FIG. 1, used with components in FIG. 1, or a combination of the two. Some or all of FIGS. 1, 2 and/or 3, in particular the quantum entanglement creator, may be included in what may be referred to as a quantum entanglement system.

The flowcharts and block diagrams in the different depicted examples illustrate the architecture, functionality, and operation of some possible implementations of apparatuses and methods in an illustrative example. In this regard, each block in the flowcharts or block diagrams may represent a module, a segment, a function, and/or a portion of an operation or step.

In some alternative examples, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Many encryption methodologies typically use random data streams for encryption keys, but not for the actual communications. Illustrated further in this disclosure are methods and systems for producing a random data stream using a quantum stream, thus providing a way to communicate information using, for example, a random bit stream which may be usable for quantum communication.

Figure 4:
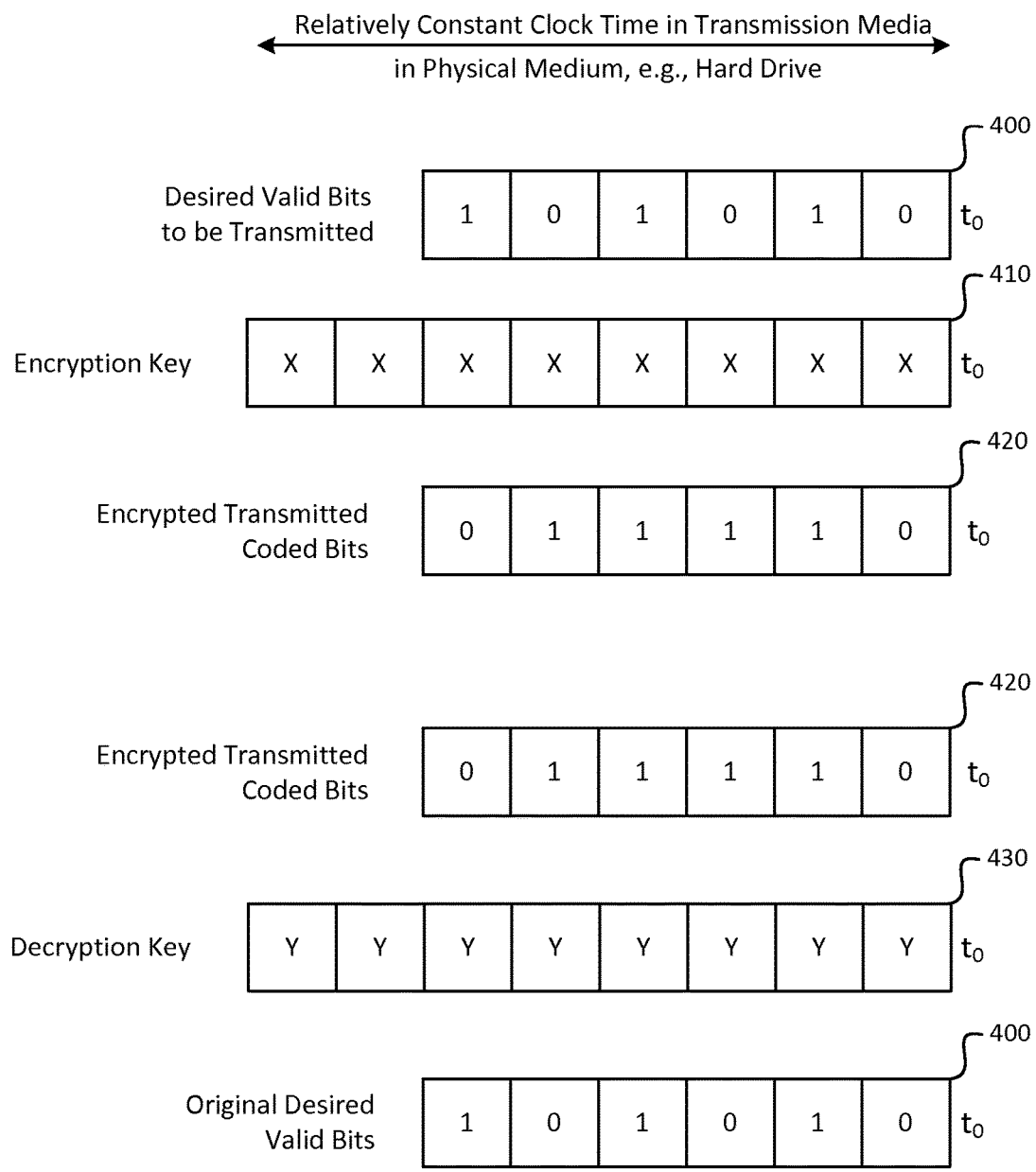
FIG. 4 depicts an example encryption/decryption method.

Referring to FIG. 4, illustrated is a typical or classical encryption method. Desired valid bits that are to be transmitted are illustrated by the desired valid bits 400 which in this example read from right to left from $t_0$ is 010101. An encryption key 410 may be used to transform the desired valid bits 400 to encrypted coded bits 420, which in this example read from right to left is 011110. The recipient of the encrypted coded bits 420 may use decryption key 430 to transform the encrypted coded bits 420 to desired valid bits 400, which in this example read from right to left is 010101.

Figure 5:
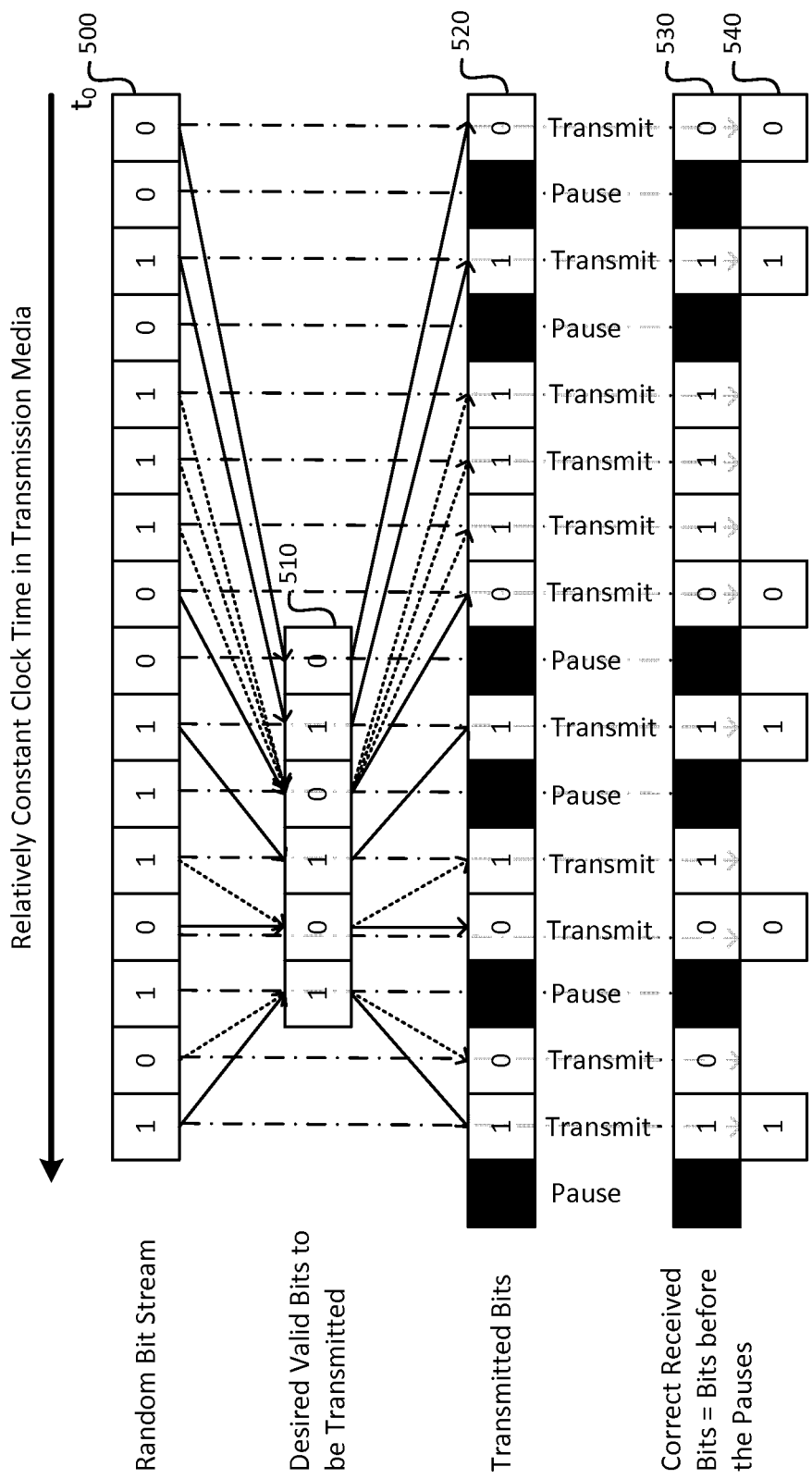
FIG. 5 depicts an example procedure for transmitting data in accordance with this disclosure.

FIG. 5 illustrates an example implementation of a method of transmitting data using a random sequence, where the random stream is actually carrying the information and not acting as the encryption key. Referring to FIG. 5, and reading from right to left from $t_0$, a bit stream 500 is shown that may represent a true random bit stream or may alternatively in some cases represent a pseudorandom sequence. Alternatively, bit stream 500 may also be a non-random stream of bits from a new or existing data source. The bit stream 500 can be, for example, a media file such as the Encyclopedia Brittanica, or any other book, song, video or other data stream. The process would work the same, with the second stream indicating where in the stream to look for the information that is "hiding in plain sight." Also illustrated is the desired valid non-random bits 510 that are to be transmitted.

In one implementation, pauses may be used when transmitting the information to indicate how the random bit stream is to be interpreted so as to arrive at the desired valid bits. In this implementation, if a bit in the bit stream 500 is the same or a correct match with the next valid bit, then the bit is transmitted followed by a pause. In one implementation, the pause may be a delay in transmission that corresponds to the period of transmission for one bit. If the bit in the bit stream 500 is incorrect and does not match the next valid bit, then the bit is transmitted without a pause. Incorrect bits are transmitted until another match occurs, upon which the bit is transmitted followed by a pause.

Referring again to FIG. 5, and reading from right to left, in the valid data stream 510, the first bit to be transmitted is a 0. Since the first bit of the bit stream 500 is a 0 and thus matches, the 0 is transmitted and a pause is included in the transmitted bits 520. Because of the inserted pause, the 0 which follows in the bit stream 500 is ignored or dropped, and the next bit in the bit stream 500 is a 1, which matches the next bit in the valid data stream 510, and thus another pause is inserted, indicating that the bit prior to the pause is valid.

Due to the pause, the next bit 0 in the bit stream 500 is skipped or dropped, and the next bit in the bit stream 500 is a 1. Since this bit does not match the next valid bit in the valid bit stream 510 which is a 0, the 1 in the random bit stream 500 is transmitted without a pause. The same occurs for the next two bits in the random bit stream 500 which are also a 1. The next bit in the bit stream 500 is a 0, which matches the next bit in the valid bit stream 510. The 0 is transmitted, and then a pause is inserted, indicating that the bit prior to the pause is valid.

The next bit in the bit stream 500 is 0 which is passed over because of the pause, and the following bit in the bit stream 500 is a 1. Since this matches the next bit in the valid bit stream 510, the bit is transmitted followed by a pause. This pattern of transmitting pauses after a valid bit continues until the valid bit stream is completed. In one example, the paused random bits may be dropped and not transmitted. Furthermore, two consecutive pauses can be transmitted to indicate an end of character, three consecutive pauses can be transmitted to indicate an end of word, four consecutive pauses can be transmitted to indicate end of message, and so on. Other combinations of pauses may be used to indicate the status of the message.

The resulting transmitted bit stream 520 may be transmitted to the recipient and received as bit stream 530. The recipient may interpret the received bit stream 530 and use the pauses to identify which bits of the bit stream 530 represent valid bits. In this implementation, the bits immediately preceding a pause are valid bits, and the recipient may determine the extracted bits 540 that match the original desired valid bits 510. In one implementation, when a random stream is desired to be transmitted and security is not an issue, the random bit stream 520 with pauses may be transmitted over an unsecure network or stored on an unsecured hard drive. In one implementation, the bit stream 500 may be transmitted to the intended recipient over a first communication channel, and may be transmitted using secure or non-secure means. An eavesdropper that intercepts the bit stream 500 would only see a random stream of bits and pauses. However, the recipient may use the pauses to determine which of the bits in the bit stream 500 represent valid bits.

Figure 6:
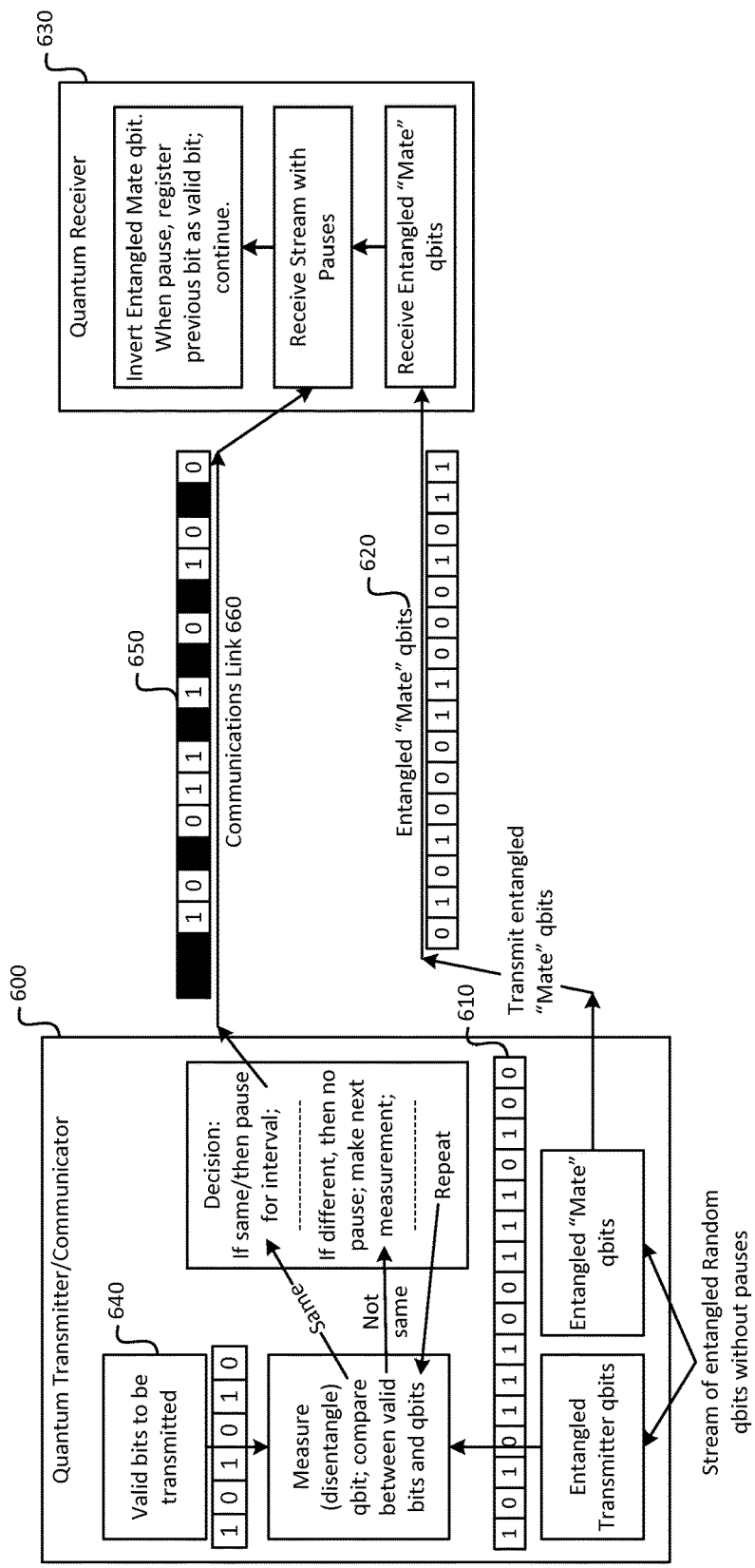
FIG. 6 depicts an example procedure for transmitting data in accordance with this disclosure.

FIG. 6 illustrates an example implementation of the described data transmission using quantum distribution. A quantum transmitter/communicator 600 is shown that may be implemented using one or more devices. As used herein, the quantum transmitter/communicator 600 may also be referred to as a quantum distributor. Also illustrated is a stream of entangled random qbits 610 without pauses. The quantum transmitter/communicator 600 transmits the entangled mate qbits 620 which is received by a quantum receiver 630.

FIG. 6 illustrates a set of valid bits 640 to be communicated to the quantum receiver 630. The quantum transmitter/communicator 600 determines valid bits 640 to be transmitted and measures or disentangles corresponding random qbits 610 and compares the qbits 610 and valid bits 640. If a qbit and a corresponding valid bit is the same, then a pause is included in communications stream 650 which may be transmitted over communications link 660. If a qbit 610 and a corresponding valid bit 640 are different, then there is no pause. This process continues until the valid bits 640 to be transmitted have been accounted for in the communications stream 650. The comparison of qbits 610 and valid bits 640 may be performed by a comparator function or comparator system.

The quantum receiver 630 receives the communications stream 650 via the communications link 660 including pauses. The quantum receiver 630 also receives entangled mate qbits 620. The entangled mate qbits 620 may be received over a communications channel capable of sending data using quantum teleportation. The quantum receiver 630 inverts the entangled mate qbits since the quantum entanglement process causes the entangled "mate" qbits 620 to be the inverse of entangled transmitter qbits 610. When a pause is detected, then the quantum receiver 630 registers the previous bit as a valid bit. The quantum receiver 630 continues this process until the valid bit stream 640 has been determined.

By using a quantum delivery means, the quantum states of the information cannot be copied, thereby allowing for eavesdropping to be detected and providing an inherently secure communications means.

It should be noted that the system illustrated in FIG. 6 is an example implementation, and the described functionality can be implemented using distributed components or as an integrated system. For example, the entangling system, random number generator, and quantum transmitter can be implemented as separate components.

It should be noted that the previous implementation using pauses is a simple illustrative example that may be understood by an eavesdropper on communications link 650. However, the use of a random bit stream to securely transmit data by using a corresponding decoding stream may be implemented using alternative more secure ways to indicate which bits of the random bit stream represent the valid bits.

In one alternative example, the communications stream 650 may be used as pointers or indicators of the desired valid bits 640 in the random qbit stream 620 by transmitting all bits in communications stream 650 as 0s, except bits that match the valid bit stream 640 are followed by a 1 (not a pause). Thus when the current bit in the random bit stream matches the current valid bit to be transmitted, then a 0 is transmitted, followed by a 1. If there is no match, then a 0 is transmitted and the next measurement is taken. When the quantum receiver detects a 1, then this indicates that the previously received bit is a valid bit. Since in this example the communications link stream 650 is no longer carrying valid bits 640, just a string of 0s, and a 1 as an indicator of a valid bit or previous valid bit 640 in totally random qbit stream 620, then an eavesdropper of communications link stream 650 obtains no valid bits 640 at all. Likewise, an eavesdropper of entangled mate qbits 620 would also just see random qbits 620 with no valid bits 640. A successful eavesdropper must eavesdrop on both streams simultaneously, correlate the pointers to see the valid bits 640, and would be detected by disturbing quantum qbit stream 620.

In another alternative example, all of the random bits in the random qbit stream 610 are transmitted with pauses after the valid bits 640, but the next bit in the random bit stream 610 is held instead of being dropped during the pause, and that held bit is then transmitted after the pause. In this way true randomness is maintained in communications stream 650 because no random bits are discarded. Thus in this implementation, if the current bit in the random qbit stream 610 does not match the next valid bit 640, then the bit is transmitted. If the current bit in the random qbit stream 610 matches the next valid bit 640, then a pause is inserted. When the quantum receiver detects a pause, then this indicates that the previously received bit is a valid bit 640, but random qbits 610 are held during a pause and transmitted next instead of being dropped.

In another alternative example, all of the random bits in the communications link stream 650 are transmitted with a 1 when the current bit in the random qbit stream 620 does not match the current valid bit 640, and a 0 indicating that the current bit in the random qbit stream 620 matches the current valid bit 640. When the quantum receiver detects a 0, then this indicates that the current random qbit 620 is a valid bit. When the quantum receiver detects a 1, then this indicates that the current random qbit 620 is not valid, so in this case receiver 630 inverts that random qbit 620 to yield the correct valid bit 640. In this example, communications stream 650 is a stream of valid or invalid "bit pointers" which are used by receiver 630 to yield the exactly correct valid bits 640. Eavesdroppers listening in on either channel cannot detect any valid bits 640. Only by eavesdropping on both communications link stream 650 and random quantum qbit stream 620 would an eavesdropper be successful, and then they would be detected for disturbing the quantum qbit stream 620.

Figure 7:
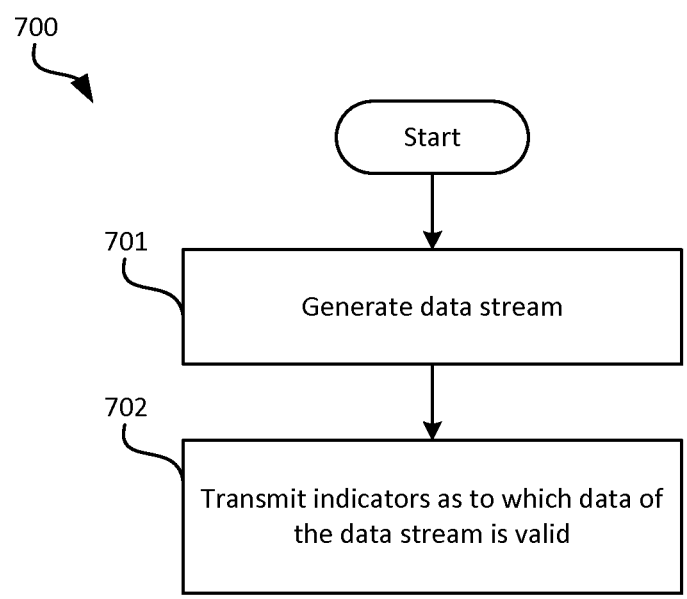
FIG. 7 depicts an example procedure for transmitting data in accordance with this disclosure.

FIG. 7 illustrates an example operational procedure 700 for transmitting data. Referring to FIG. 7, operation 701 illustrates generating a data stream. Operation 701 may be followed by operation 702. Operation 702 illustrates transmitting data comprising indicators as to which data of the data stream is valid data to be communicated. In one implementation, the indicators may comprise pauses. In some implementations, the data stream may be a random data stream. In one implementation, the data stream may be transmitted, which may or may not be a quantum random data stream.

Figure 8:
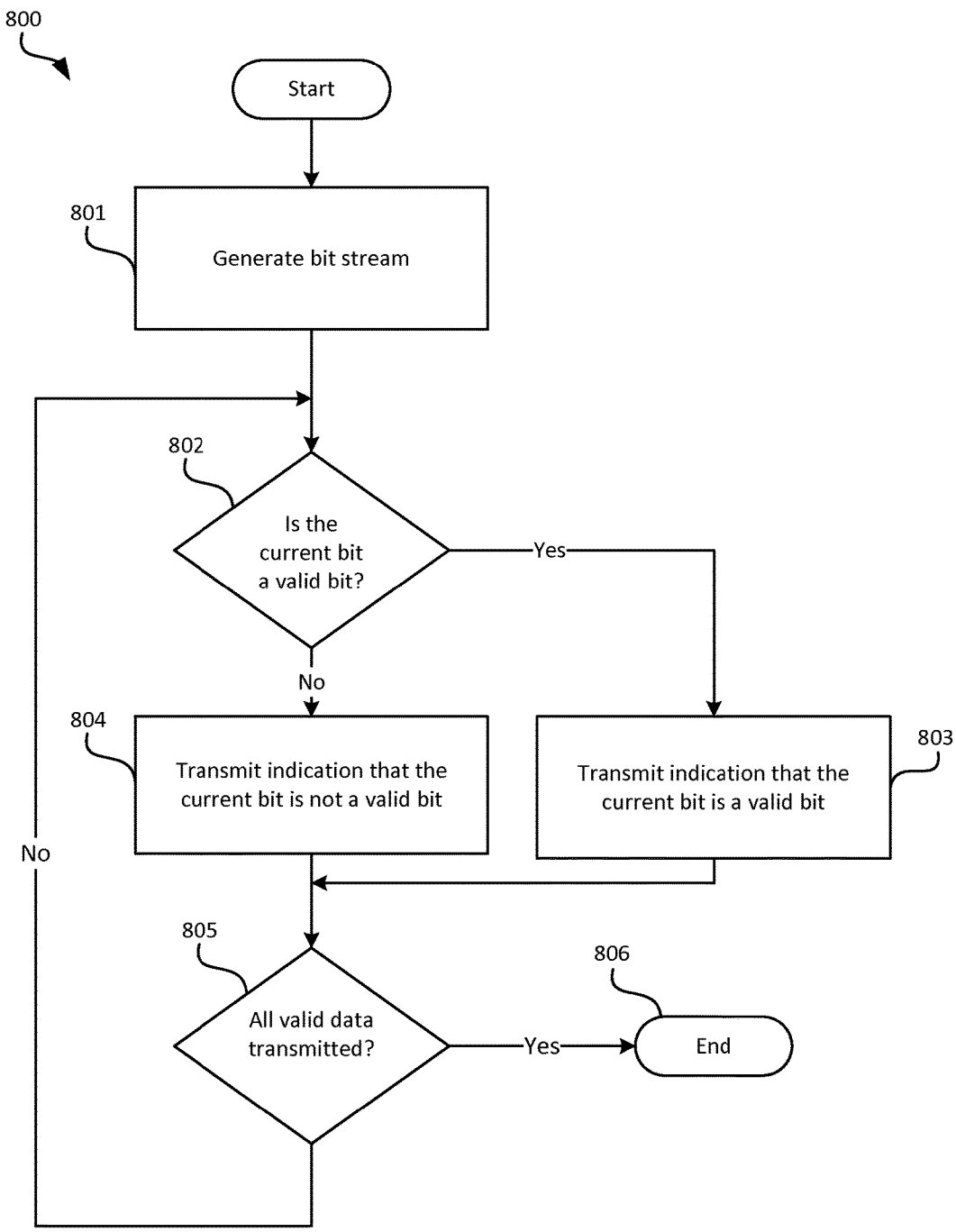
FIG. 8 depicts an example procedure for transmitting data in accordance with this disclosure.

FIG. 8 illustrates an example operational procedure 800 for transmitting data. Referring to FIG. 8, operation 801 illustrates generating a bit stream. In some implementations, the bit stream may be a random bit stream. In one implementation, the bit stream may be transmitted to the recipient. Operation 801 may be followed by operation 802. Operation 802 illustrates determining if a current bit of the bit stream corresponds to a valid bit to be transmitted. If the current bit corresponds to a valid bit, then operation 802 may be followed by operation 803. Operation 803 illustrates transmitting an indication that the transmitted bit is a valid bit. If the current bit does not correspond to a valid bit, then operation 802 may be followed by operation 804. Operation 804 illustrates transmitting an indication that the transmitted bit is not a valid bit. As described above, in various implementations a pause, 1, or 0 may be used to indicate a valid bit, and invalid bits may be indicated by the lack of a pause, or by a 1 or 0 depending on the implementation. Operations 803 and 804 may be followed by operation 805. Operation 805 illustrates determining if all of the valid data has been transmitted. If all of the valid data has been transmitted, then operation 805 may be followed by operation 806. If all of the valid data has been transmitted, then operation 805 may be followed by operation 802.

Although not required, the methods and systems disclosed herein may be described in the general context of computer-executable instructions, such as program modules, being executed by a computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations. The methods and systems disclosed herein may also be practiced in distributed computing environments where tasks are performed by remote processing devices that are linked through a communications network. In a distributed computing environment, program modules may be located in both local and remote memory storage devices.

Additionally, it should be appreciated that the functionality disclosed herein might be implemented in software, hardware or a combination of software and hardware. Other implementations should be apparent to those skilled in the art. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method for transmitting data comprising:
   transmitting first data comprising a random data stream; and
   transmitting second data comprising indicators as to which data of the random data stream is valid data to be communicated, the first data transmitted using quantum entanglement;
   wherein the random data stream is a random bit stream and the second data comprises a bit stream that corresponds to the random bit stream with a pause inserted to indicate that a previous bit is a valid bit.

2. The method of claim 1, wherein the second data is transmitted over a different communication channel.

3. The method of claim 1, wherein the pause is inserted in lieu of a current bit in the random bit stream.

4. The method of claim 1, wherein two consecutive pauses are inserted to indicate an end of character.

5. The method of claim 1, wherein three consecutive pauses are inserted to indicate an end of word.

6. The method of claim 1, wherein four consecutive pauses are inserted to indicate an end of message.

7. A method for transmitting data comprising:
   transmitting first data comprising a random data stream; and
   transmitting second data comprising indicators as to which data of the random data stream is valid data to be communicated, the first data transmitted using quantum entanglement;
   wherein the random data stream is a random bit stream and the second data comprises a bit stream that corresponds to the random bit stream with a first value of 0 inserted to indicate that a previous bit is a valid bit, and a second value of 1 is transmitted to indicate that a current bit is not a valid bit, and the 0 is inserted prior to inserting the 1.

8. A method for transmitting data comprising:
   transmitting first data comprising a random data stream; and
   transmitting second data comprising indicators as to which data of the random data stream is valid data to be communicated, the first data transmitted using quantum entanglement;
   wherein the random data stream is a random bit stream and the second data comprises a bit stream that corresponds to the random bit stream with a pause being transmitted to indicate that a current bit is a valid bit, and otherwise transmitting the current bit.

9. A method for transmitting data comprising:
   transmitting first data comprising a random data stream; and
   transmitting second data comprising indicators as to which data of the random data stream is valid data to be communicated, the first data transmitted using quantum entanglement;
   wherein the random data stream is a random bit stream and the second data comprises a bit stream that corresponds to the random bit stream with a first value of 0 being transmitted to indicate that a current bit is a valid bit, and otherwise transmitting a second value of 1, and the 0 is inserted prior to inserting the 1.

10. An apparatus comprising:
    a quantum entanglement system configured to generate a random stream of quantum entangled qbits and a corresponding stream of quantum entangled qbits;
    a first transmitter configured to transmit first data comprising the random stream of quantum entangled qbits generated by the quantum entanglement system;
    a comparator system configured to compare between valid bits to be transmitted and the corresponding stream of quantum entangled qbits to determine which data of the first data stream is valid; and a second transmitter configured to transmit second data comprising indicators as to which data of the first data stream is valid data as determined by the comparator system.

11. The apparatus of claim 10, wherein the quantum entanglement system is configured to send a plurality of photons carrying the random data stream.

12. The apparatus of claim 11, wherein the quantum entanglement system is further provided using an entanglement creator configured to create a pair of entangled photons in which a first entangled photon in the pair of entangled photons is sent to meet with an incoming photon in the plurality of photons and in which a second entangled photon in the pair of entangled photons is used to form an outgoing photon in the plurality of photons.

13. The apparatus of claim 10, wherein the random data stream is a random bit stream, and the second data comprises a bit stream that corresponds to the random bit stream with a pause inserted to indicate that a previous bit is a valid bit.

14. The apparatus of claim 10, wherein the random data stream is a random bit stream, and the second data comprises a bit stream that corresponds to the random bit stream with a 1 inserted to indicate that a previous bit is a valid bit, a 0 is transmitted to indicate that a current bit is not a valid bit, and a 0 is inserted prior to inserting the 1.

15. The apparatus of claim 10, wherein the random data stream is a random bit stream, and the second data comprises a bit stream that corresponds to the random bit stream with a pause being transmitted to indicate that a current bit is a valid bit, and otherwise transmitting the current bit.

16. The apparatus of claim 10, wherein the random data stream is a random bit stream, and the second data comprises a bit stream that corresponds to the random bit stream with a 0 being transmitted to indicate that a current bit is a valid bit, and otherwise transmitting a 1.

17. A method for receiving data comprising:
receiving first data comprising an unencrypted random data stream using quantum entanglement;
receiving second data sent, the second data comprising indicators as to which data of the unencrypted random data stream is valid data to be communicated, the indicators usable to identify portions of the unencrypted random data stream that form the valid data; and
using the first and second data to generate the valid data;
wherein the random data stream is a random bit stream and the second data comprises a bit stream that corresponds to the random bit stream with a pause inserted to indicate that a previous bit is a valid bit.

18. The method of claim 17, wherein the second data is received over a different communication channel.

19. The method of claim 17, wherein the pause is inserted in lieu of a current bit in the random bit stream.

20. The method of claim 17, wherein two consecutive pauses are inserted to indicate an end of character.

21. The method of claim 17, wherein three consecutive pauses are inserted to indicate an end of word.

22. The method of claim 17, wherein four consecutive pauses are inserted to indicate an end of message.

23. A method for receiving data comprising:
receiving first data comprising a random data stream; and
receiving second data comprising indicators as to which data of the random data stream is valid data to be communicated, the first data transmitted using quantum entanglement;
wherein the random data stream is a random bit stream and the second data comprises a bit stream that corresponds to the random bit stream with a first value of 0 inserted to indicate that a previous bit is a valid bit, and a second value of 1 is received to indicate that a current bit is not a valid bit, and the 0 is inserted prior to inserting the 1.

24. A method for receiving data comprising:
receiving first data comprising a random data stream; and
receiving second data comprising indicators as to which data of the random data stream is valid data to be communicated, the first data transmitted using quantum entanglement;
wherein the random data stream is a random bit stream and the second data comprises a bit stream that corresponds to the random bit stream with a pause being received to indicate that a current bit is a valid bit, and otherwise receiving the current bit.

25. A method for receiving data comprising:
receiving first data comprising a random data stream; and
receiving second data comprising indicators as to which data of the random data stream is valid data to be communicated, the first data transmitted using quantum entanglement;
wherein the random data stream is a random bit stream and the second data comprises a bit stream that corresponds to the random bit stream with a first value of 0 being received to indicate that a current bit is a valid bit, and otherwise receiving a second value of 1, and the 0 is inserted prior to inserting the 1.

* * * * *